INVENTOR.
GEORGE THODOS

Patented Oct. 20, 1953

2,656,010

UNITED STATES PATENT OFFICE 2,656,010

REMOVAL OF NITROGEN FROM NATURAL GAS

George Thodos, Bartlesville, Okla., assignor to Phillips Petroleum Company, a corporation of Delaware Application April 15, 1946, Serial No. 662,152

2 Claims. (Cl. 183—114.2)

This invention relates to methods for separating nitrogen from natural gas. In one particular aspect it relates to methods for increasing the heating value of natural gas and in another particular aspect it relates to methods for decreasing the volume occupied by natural gas by removing inert materials therefrom, and thereby greatly reducing the cost of pipeline transportation.

Natural gas as it comes from producing wells often contains considerable quantities of nitrogen. Wells in the Panhandle area of Texas, for example, often yield gas in which the nitrogen content is from 12 to 15 mol per cent. An example is the natural gas from the Hugoton field in Texas. Natural gas produced in certain sections of Kansas and elsewhere is objectionably high in nitrogen content. For many uses the presence of nitrogen in such proportions is not particularly disadvantageous, but transportation of such inert diluent over long distances is costly and it is often desirable to increase the heating value of the gas by eliminating inert materials.

For example, assume that 300,000,000 cubic feet of natural gas containing 12.38 mol per cent of nitrogen are to be transported for a distance of 1000 miles by pipeline. Experience has shown that the daily cost of pipeline investment, power consumption and maintenance for pipeline sizes of 12 inches or greater is one cent per 1000 cubic feet per 100 miles. Then the cost of transporting 300,000,000 cubic feet of gas 1000 miles figures $30,000 per day. By removing the nitrogen from the gas prior to its transportation, assuming a saving proportional to the volume reduction, the cost of transporting the gas will be reduced to $26,300 per day, a saving of $3,700 per day. If the nitrogen is removed from the gas before its delivery to the pipeline, great savings in compression costs and in the capital cost of the pipeline and compression equipment may be effected.

It has become customary to employ natural gas in city gas systems. The natural gas may be employed in the form in which it is received in the city or it may be used to enrich ordinary manufactured gas to increase the heating value thereof. In either event and especially where the natural gas is used for enrichment of manufactured gas, it is desirable that the natural gas have as high a B. t. u. value as possible. At the same time it is customary to remove from the natural gas at or near the point of its production, as much of the heavier components as is economically possible. This may be done by the ordinary processes of making natural gasoline. The heavier components (especially propane and heavier), when separated and liquefied, bring a much higher price than they would if they were left in the gas and sold in the gaseous form. At the same time there are minimum specifications on the heating value of natural gas sold for fuel purposes. Usually it is required that the gas have a minimum heating value of 1000 B. t. u. per cubic foot. This prevents the natural gasoline manufacturer from "cutting" too deeply into the gas for extraction of $C_3$ and heavier components, especially if the gas contains substantial quantities of nitrogen. For example, a gas having a calorific value of 1000 B. t. u. per cubic foot and containing 15 per cent by volume of nitrogen will have a heating value of 1,150 B. t. u. upon removal of this nitrogen. Then also, a gas of this latter heating value can yield a considerable quantity of liquefiable components (such as gasoline hydrocarbons) and yet maintain a heating value of 1000 B. t. u.

A typical natural gas from the Texas Panhandle area may be analyzed as follows:

| Component | Mol Fraction | Heating Value B. t. u./ Cu. Ft. of Pure Component | Heating Value Contributed to Gas |
|---|---|---|---|
| Nitrogen | 0.1238 | 0 | 0 |
| Methane | 0.7458 | 1,013 | 756 |
| Ethane | 0.0634 | 1,775 | 112 |
| Propane | 0.0411 | 2,526 | 104 |
| Butane | 0.0176 | 3,276 | 58 |
| Pentane | 0.0051 | 4,025 | 20 |
| Hexane | 0.0019 | 4,773 | 9 |
| $C_7+$ | 0.0013 | 5,521 | 7 |
| Total | | | [1] 1,066 |

[1] B. t. u./cu. ft.

If the nitrogen content of such a gas be removed, the resulting gas has its heating value increased to 1215 B. t. u. per cubic foot as shown in the following table:

| Component | Mol Fraction | Heating Value Contributed to Gas |
|---|---|---|
| Methane | 0.8511 | 862 |
| Ethane | 0.0724 | 128 |
| Propane | 0.0469 | 118 |
| Butane | 0.0201 | 66 |
| Pentane | 0.0058 | 23 |
| Hexane | 0.0022 | 10 |
| $C_7+$ | 0.0015 | 8 |
| Total | | [1] 1,215 |

[1] B. t. u./cu. ft.

From the foregoing it will be seen that the removal of nitrogen from natural gas is very important. Various means have heretofore been proposed for effecting removal of nitrogen from natural gas. Previous proposals may be divided broadly into two classes which in turn may be subdivided broadly into two classes, as follows: (A) Chemical methods, (1) fixation of nitrogen as by causing the nitrogen selectively to chemically react with a chemical element or compound to form a compound which may then be separated from the unreacted hydrocarbon residue gas, (2) selective reaction of the hydrocarbon with a suitable material, such as reaction with water to form the hydrate which may be separated and treated in known manner to regenerate the hydrocarbon; and (B) Physical methods, (1) separation of nitrogen from hydrocarbon as by scrubbing with a solvent which selectively dissolves the nitrogen and is relatively a non-solvent for the hydrocarbons, by a diffusion method taking advantage of the difference in diffusion rates of the nitrogen and the hydrocarbon through a suitable membrane or diffusion member, (2) separation of hydrocarbon from nitrogen as by scrubbing the gas with a solvent which dissolves the hydrocarbon and is relatively a non-solvent for nitrogen, or by so-called "deep refrigeration" in which the natural gas is liquefied and fractionally distilled at low temperatures. For various reasons no plan for the removal of nitrogen has been used commercially. Each of the previously advanced proposals has involved various disadvantages, such as excessive costs, insufficient separation factor, etc. Therefore the problem is still essentially an unsolved one.

It is the principal object of my invention to provide a method for the separation of nitrogen from natural gas in a simple and economical manner. Another object is to provide such a method in which refrigeration requirements are very much lower than in so-called "deep refrigeration" processes for nitrogen removal. Another object is to provide a process whereby the nitrogen removal is accomplished continuously in a single moving column of adsorbent material whereby the necessity of using batch-type operation with periodic switching is eliminated. Many other objects will hereinafter appear.

Figure 3:
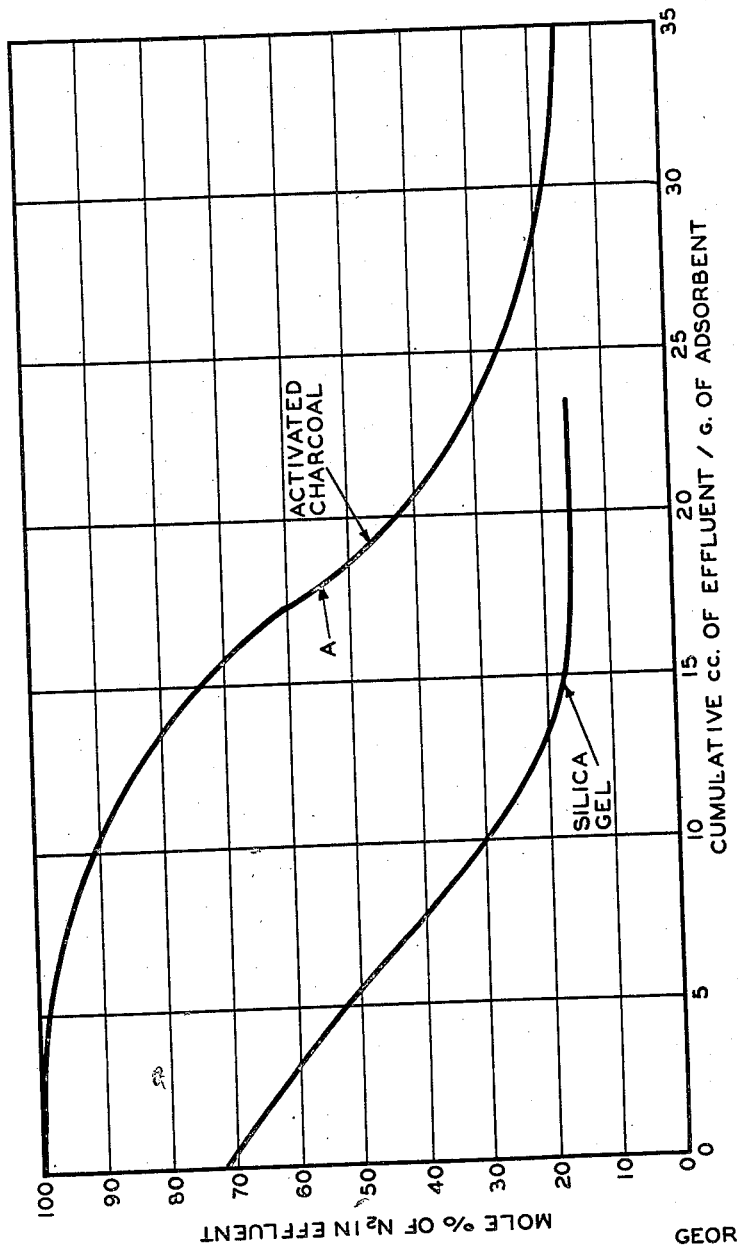
Figure 4:
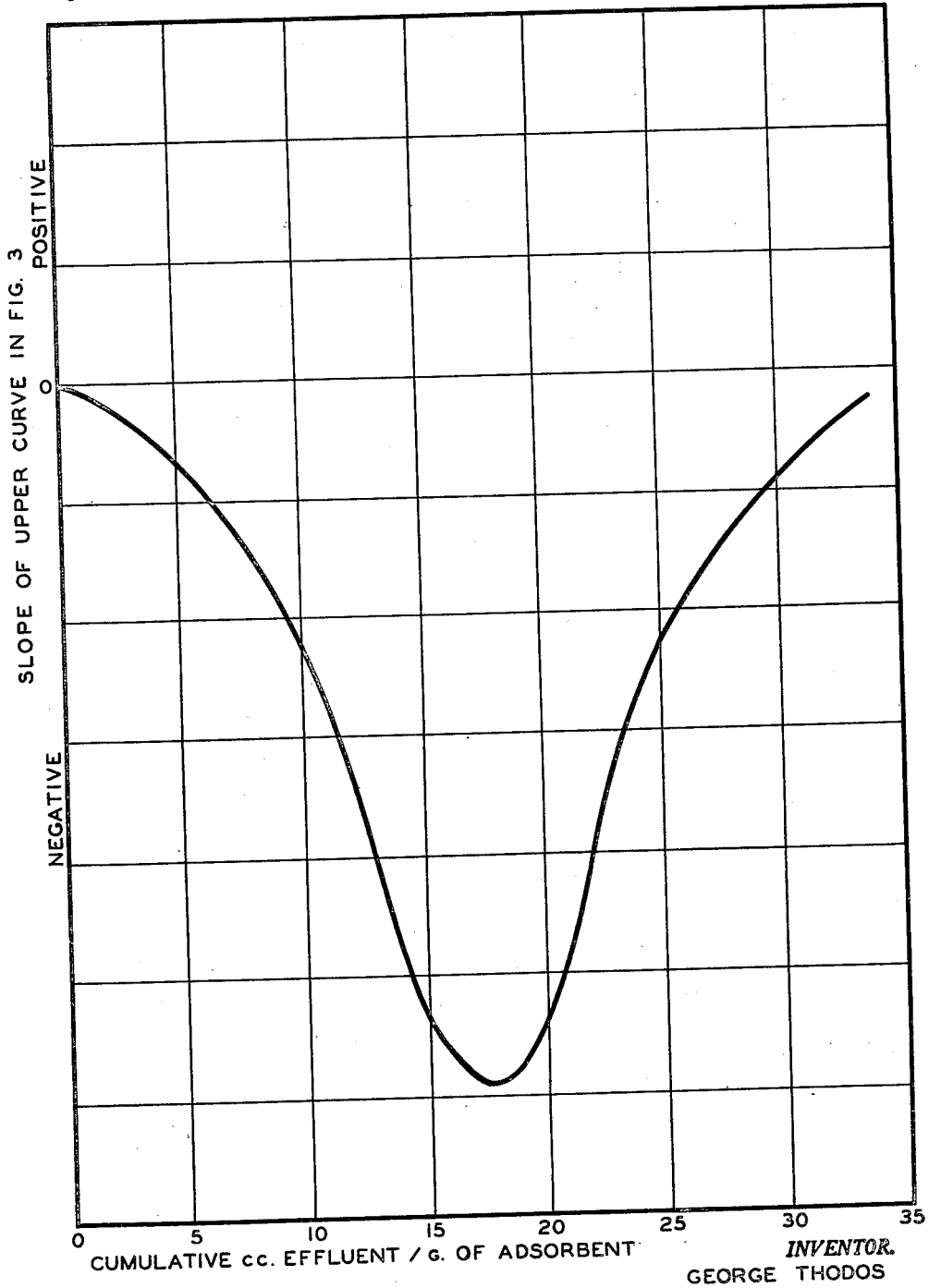

Fig. 3 portrays graphs showing the adsorptive action of activated charcoal and silica gel on a nitrogen-methane mixture (these curves are based on batchwise experiments described in detail below); and Fig. 4 is a graph in which the slope of the upper curve of Fig. 3 is plotted against the cumulative effluent gas to give a measure of the rate of change of nitrogen concentration of the effluent.

In accordance with my invention nitrogen is separated from natural gas by effecting the selective adsorption of the hydrocarbons present in the natural gas on a solid adsorbent that has extensive adsorption area. Examples of such solids are activated carbon and silica gel. In this way there is produced an unadsorbed residue gas mixture rich in nitrogen. This nitrogen-rich mixture may be discarded or processed as desired.

It is preferred to conduct the adsorption of the hydrocarbons at reduced temperature. Subsequent desorption of the adsorbed hydrocarbons is brought about by raising the temperature of the adsorbent.

The temperature of adsorption is to be maintained as low as possible (consistent with the economics involved) in order to effect the greatest possible adsorption of hydrocarbons on the solid adsorbent. The temperature may range from $-10$ to $-100°$ F. or even lower down to $-150°$ F. Ordinarily I prefer to use temperatures attainable with propane refrigeration; a temperature as low as $-43.7°$ F. (the boiling point of propane at atmospheric pressure) may be obtained with liquid propane. A temperature of $-35°$ F. can be obtained very easily by the vaporization of liquid propane near atmospheric pressure. Liquid propane is especially suitable as a refrigerant because it can be liquefied at moderate pressures at the temperature of ordinary cooling water available at the refinery. Also propane is cheap and, being a by-product of natural gas production, is readily available at the point where the natural gas is being treated in accordance with my invention.

Instead of propane I may use propylene as the refrigerant. Propylene enables somewhat lower temperatures to be attained than are possible with propane, since the boiling point of propylene is $-54°$ F. At the same time propylene can be liquefied at moderate pressures and at temperatures attainable with cooling water. However pure propylene is not very readily available and if it is impure the evaporators gradually become filled with the impurity which is principally propane, due to a rectification effect.

I am not limited to use of a hydrocarbon refrigerant. Non-hydrocarbons may be used if they have the necessary physical properties.

The temperature attainable will depend upon the pressure to which the liquid refrigerant is evaporated; thus, by varying this pressure and selecting the refrigerant, any desired temperature can be maintained in the adsorption step. The nearer that pressure is to atmospheric the nearer the temperature attainable approaches the normal boiling point of the refrigerant. A vacuum may be used on the refrigerant evaporators in order to enable a still lower temperature to be obtained, but use of a vacuum is not ordinarily economically justified.

If lower temperatures than are readily obtainable with propane or propylene refrigeration are desired, liquid ethane or ethylene refrigeration may be used. Thus liquid ethane or liquid ethylene enables temperatures ranging downwardly from $-50°$ F. to $-80$ or to $-110°$ F. or even lower to $-155°$ F. in the case of ethylene to be easily attained. However use of ethane or ethylene as the refrigerant is disadvantageous for at least two reasons, namely, that it requires a cascade system of refrigeration going through propane in order to effect liquefaction of the ethylene or ethane and also because at such low temperatures the use of expensive nickel steel construction may be necessary.

I prefer to cool the incoming nitrogen-containing natural gas. The cooler this feed gas the more easily the temperature in the adsorption zone is kept at the desired level. Cooling this feed to a temperature approaching, equal to, or below that maintained in the adsorption zone is often preferred. The adsorption is exothermic and therefore positive removal of heat from the adsorption zone itself, in addition to cooling the incoming feed, is often desirable. The adsorption zone may be cooled in any suitable way, preferably by circulation of a refrigerating medium in indirect heat exchange with the adsorptive medium. In some cases cooling of the feed gas to a temperature below that to be maintained in the adsorption zone is highly advantageous since it facilitates temperature maintenance. Cooled feed gas may be introduced multipointwise directly into the adsorption zone. The problem of obtaining heat transfer in the adsorption zone may be a serious one because of the low heat conductivity of the adsorbent. Direct injection of liquid hydrocarbon such as liquid ethane, propane or butane, at a plurality of points along the adsorption zone may be employed as a means of temperature control whereby the vaporization of such hydrocarbon effects very marked cooling directly at the points where cooling is needed, the resulting gaseous hydrocarbon also being adsorbed and appearing in the relatively nitrogen-free natural gas produced by stripping of the adsorbent medium.

Experimental work on the adsorption of methane on activated charcoal and on silica gel at atmospheric pressure and varying temperature indicates the following adsorptive capacity:

| Temp., °F. | Cubic Feet of Methane Absorbed per Cu. Ft. of— | |
|---|---|---|
| | Act. Charcoal | Silica Gel |
| 80 | 14.4 | 2.4 |
| 32 | 22.7 | 3.7 |
| −30 | 40.0 | 6.9 |
| −40 | 43.2 | 7.9 |
| −50 | 48.2 | 9.0 |
| −60 | 51.3 | 10.2 |
| −70 | 56.0 | 12.0 |
| −80 | 62.0 | 14.0 |
| −90 | 66.0 | 16.2 |
| −100 | 72.5 | 19.0 |
| −109 | 78.7 | 21.7 |

It will be seen that activated charcoal was much superior to silica gel. The activated charcoal used in the experimental work just referred to was a sample of 4–14 mesh material made by Carbide and Carbon Chemicals Corporation and designated as "Columbia Activated Charcoal, Grade 4S"; it had an apparent density of 33 pounds per cubic foot. It was activated before use by treatment with air at 842° F. and by degassing to a pressure of $10^{-4}$ mm. of mercury. The silica gel was 20 mesh material manufactured by the Davison Chemical Corporation; it had an apparent density of 42 pounds per cubic foot. It was activated before use by degassing at 842° F. to a pressure of $10^{-4}$ mm. of mercury.

The experimental work just described clearly shows the advantage of using as low a temperature as possible in the adsorption step in order that the size of the equipment required to treat a given volume of natural gas may be kept at a minimum. I ordinarily use a temperature at least as low as −30° F. and ranging therefrom down to −50° F. However, temperatures ranging from −30° F. to −155° F. (the boiling point of ethylene at atmospheric pressure) may be used. If ethane is the refrigerant the temperature may range from −80° F. to −120° F., while with ethylene the temperature may range from −80° F. to −150° F. If ethylene is used, it should be essentially pure since if it is contaminated with ethane, liquid ethane may build up in the evaporators by rectification and prevent attainment of the desired temperature.

In a preferred embodiment of my invention, the nitrogen-containing natural gas is continuously fed into an intermediate point in a downwardly continuously moving vertical bed of granular adsorbent, preferably activated carbon, under conditions such that the hydrocarbons are adsorbed preferentially, the nitrogen being relatively unadsorbed. The gaseous feed countercurrently contacts the descending adsorbent. Stripped and/or fresh adsorbent is continuously introduced to the top of the moving column at a rate equivalent to that at which desorbed adsorbent is removed from the bottom of the column. The top of the column is maintained at a suitably low temperature, say ranging from −30 to −150° F. and more commonly from −30 to −50° F. in order to minimize refrigeration costs, as by means of overhead vapors that are cooled and recycled and made to intimately contact the incoming adsorbent, thereby cooling the adsorbent added at the top of the column. The recycle gases may conveniently serve as a gas lift to elevate the adsorbent. In addition it is preferred to provide indirect cooling at the top of the column, such as by means of propane refrigeration, liquid propane being expanded in indirect heat exchange with the top of the bed. The recycle overhead gases are cooled by external means. Part of the overhead vapors is continuously withdrawn as an overhead product. This stream is rich in nitrogen. The nitrogen content may range from 50 to 100 mol per cent of the overhead gases. The overhead product may contain from 50 to 100 per cent of the nitrogen contained in the incoming feed gases. Adjustment of the nitrogen concentration of the overhead gases and of the proportion of the nitrogen removed from the feed will depend upon the wishes of the operator.

The adsorbed gases are desorbed from the adsorbent at the base of the tower. This may be accomplished by heating the adsorbent attaining the bottom of the tower to any suitable elevated temperature at which essentially all of the adsorbed gases are driven off, say to from 200 to 250° F. This may conveniently be done by withdrawing a vapor stream at the bottom of the tower as bottoms product, passing a portion of this vapor stream through a heater of any suitable type to heat it to the desired temperature, say 200 to 250° F., and then re-introducing into the base of the tower to strip out the adsorbed gases from the adsorbent. The heating may be accomplished by burning of fuel or by indirect contact with steam. As will appear below, I prefer to carry out the adsorption in the absence of water because it would freeze in the unit. The bottoms product is withdrawn at a point adjacent but above the heated section of the moving bed.

The denuded adsorbent is brought to the top of the tower in any suitable way, for example, by buckets or preferably by a gas lift using cooled overhead vapors as above described as the lifting medium.

It will be understood that the action in the moving column of adsorbent is comparable to the vapor-liquid equilibria existing in a fractional distillation column. Rectification and stripping occur in the moving bed much as the ordinary fractional distillation column embodies a rectification section and a stripping section. In that portion of the moving bed which lies between the heated section and the point of feed entry, removal of nitrogen by displacement with stripped vapors takes place so that this portion corresponds to the stripping section of a fractional distillation column. In that portion of the moving bed between the feed entry and the cooled upper section adsorption and rectification take place with successive establishment of equilibria between free gas and adsorbed gas in a manner entirely analogous to that in the rectifying section of a fractional distillation column. The action in a continuous moving bed adsorber may be considered by some to more nearly resemble that in an extractive distillation column, i. e., a column wherein selective solvent extraction and fractional distillation are combined, the adsorbent being analogous to the solvent; there is this difference, however, that in an extractive distillation column the rich solvent is not stripped in the bottom of the column (although of course it is reboiled) but is stripped in a separate column.

The adsorbent is fed to and withdrawn from the moving column at a rate such as to effect the desired degree of nitrogen separation. There is a minimum rate, which is readily determined by experimentation, below which the desired separation cannot be made. Any rate of feed of adsorbent relative to incoming gas in excess of this minimum may be employed; however, economic considerations will operate to place an upper limit thereon.

Figure 1:
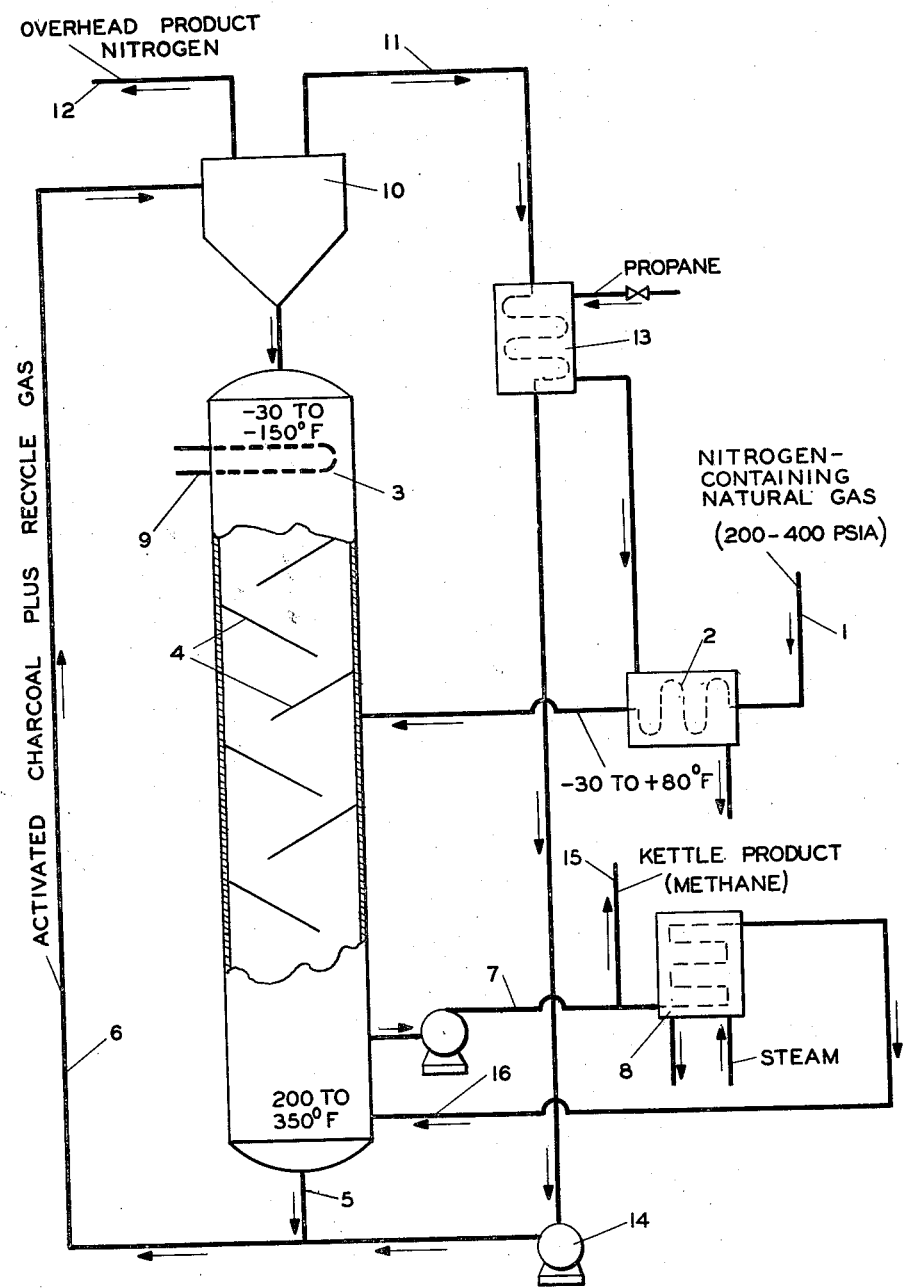
Fig. 1 shows diagrammatically a preferred arrangement of equipment which may be employed for carrying out the process of my invention.

Fig. 1 of the drawings portrays the embodiment of my invention just described. In this figure the nitrogen-containing natural gas at any suitable pressure, such as the well pressure, and with or without previous treatment to remove the condensable components ($C_3$ and heavier) for liquefied petroleum gas or natural gasoline, enters via line 1, is pre-cooled in cooler 2 to any suitable temperature, and fed into moving activated charcoal bed adsorber 3 which may be equipped with baffles 4 of any suitable type to promote intimacy of contact. The denuded charcoal is withdrawn continuously through line 5, which may be equipped with any suitable means such as a star or barrel valve for withdrawing solid granular material without allowing gas to escape from unit 3. The charcoal is continuoulsy elevated by a gas lift via line 6 with a portion of the overhead gas which is passed via line 11 through cooler 13, wherein it may be cooled to any suitable temperature, and blower 14 to pick up the withdrawn charcoal and elevate it to separator 10 whence it may return to the top of unit 3. Cooler 13 may serve to remove all of the heat from the top of the charcoal column. Alternatively to cooler 13 or in addition thereto, I may employ cooling means 9 in the top of the moving bed to cool the top of said bed, suitable refrigerant, such as liquid propane being injected into the cooling coil 9 and expanded in indirect heat exchange relationship with the top of the moving bed. The temperature to which the gas used for lifting the charcoal is cooled may be the same as that in the top of the bed. The balance of the overhead gas it withdrawn continuously via line 12 and is a nitrogen-rich stream which may be put to any desired use.

The bottoms product is withdrawn via line 7. A portion of this gaseous stream is withdrawn continuously via line 15 and constitutes the denitrogenated natural gas product of my invention. The balance of the bottoms product is passed through heater 8 where it is heated, preferably without introduction of water, for example, by indirect contact with steam, and the heated gas is injected via line 16 into the bottom of tower 3.

As shown, I prefer to expand liquid propane in cooler 13 and expand the resulting propane to a still lower pressure in cooler 2 since it is important that the temperature of the top of column 3 be lower than the temperature at the point of feed entry.

The pressure on the adsorber 3 may vary within wide limits. I prefer to operate it at as nearly the pressure at which the incoming natural gas is available as is possible. This avoids, or minimizes, the necessity for expensive recompression of the treated gas issuing from the process of my invention in order to prepare it for pipeline transmission. Thus where the gas is available at the well discharge pressure, I operate the adsorber at as nearly this pressure as possible. If the incoming gas has been treated to remove condensate, as for example by passage through a natural gasoline plant, I operate the adsorber at as nearly the pressure of the gasoline plant residue gas as is possible. Some pressure drop through the adsorber used in removing the nitrogen in accordance with my invention is inevitable, and it may be necessary to compress it to restore it to the pressure at which it entered the process of my invention or to bring it to a higher pressure for admission to the transmission system.

It is important that the system wherein my invention is practiced be maintained anhydrous. Water in any form should be rigidly excluded. This may be accomplished by dehydrating the incoming natural gas feed in known manner and by using an adsorbent which does not liberate water during the treatment. The presence of water in the system is highly disadvantageous because it freezes on and in the adsorbent and so prevents access of the gas to the pores of the adsorbent and increases the pressure drop through the system.

The natural gas feed is preferably free from objectionable impurities such as hydrogen sulfide and carbon dioxide. These should be removed from the gas in any known manner prior to its admission to the adsorbent.

While I prefer to carry out the adsorption and desorption in a continuous manner, using a continuous moving column of adsorbent, preferably highly gas adsorptive activated carbon, much less desirably I may employ a fixed bed of the adsorbent and utilize alternate periods of adsorption and desorption, the adsorbent being cooled by circulation of a suitable refrigerant during the adsorption portion of the cycle and being heated in any suitable manner during desorption. At least two such beds are provided, one being on-stream while the other is being desorbed, the usual provision being made for manifolding the several beds so that the nitrogen-rich effluent rejected during adsorption and the relatively nitrogen-free natural gas liberated during desorption are separately collected and maintained. When such a system is used I prefer to apply low pressure to the adsorption tower during the desorption cycle in order to bring about a greater hydrocarbon recovery. Thus the pressure during desorption may be reduced to nearly atmospheric. The use of high pressures and low temperatures during adsorption and of low pressures and elevated temperatures during desorption greatly increases the capacity of a unit of given size although it introduces the disadvantage that the desorbed gas must be compressed to restore it to its original pressure whereas when a continuous moving bed adsorber is used the desorbed gas is at the original pressure minus the slight pressure drop due to passage through the adsorber.

Figure 2:
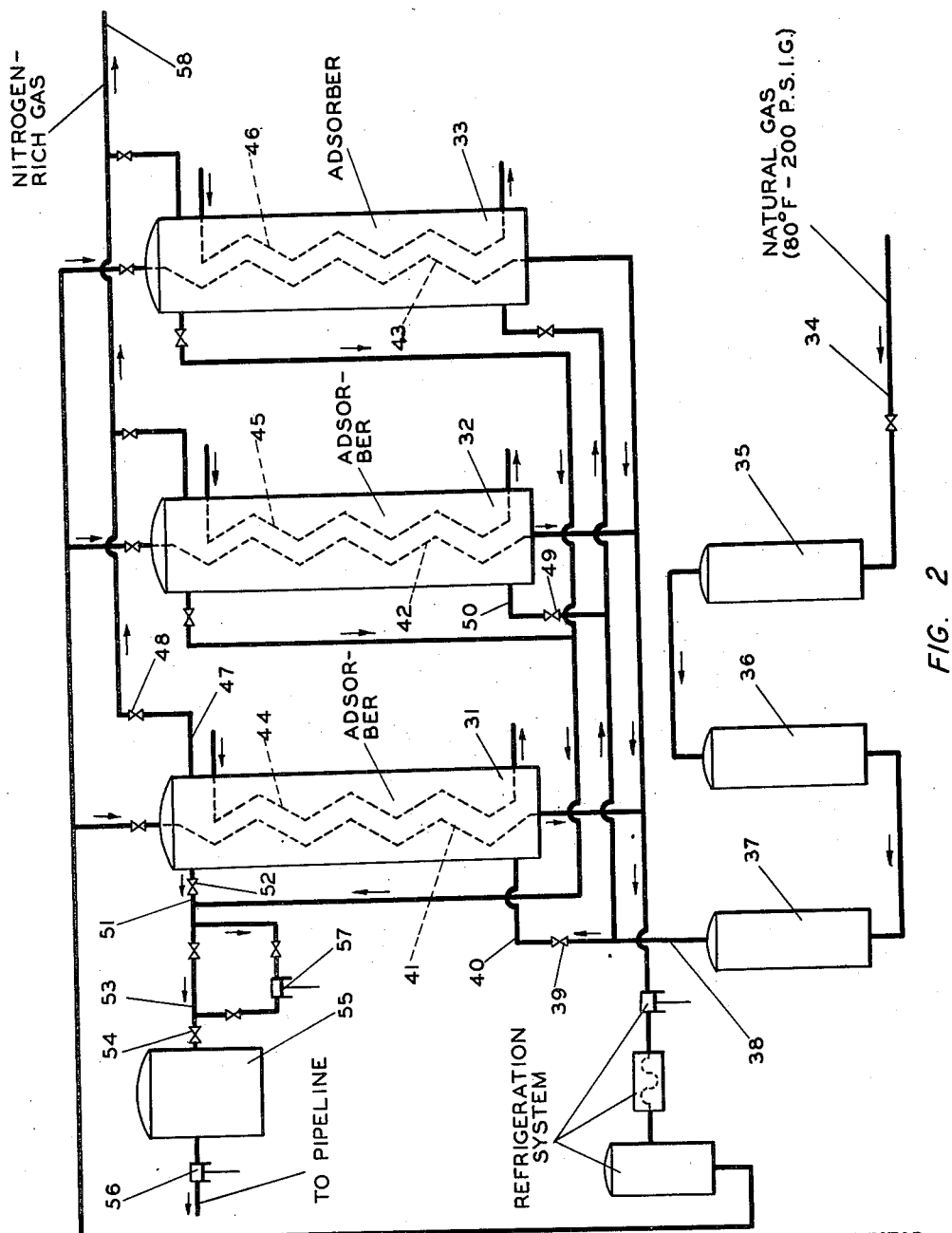
Fig. 2 shows another arrangement wherein fixed beds of adsorbent are employed.

A plant layout employing fixed or stationary type adsorbers is shown in Fig. 2 of the drawings. The main elements of this arrangement are a plurality of large adsorbers 31, 32 and 33 that are connected in parallel and filled with a suitable adsorbent. During the adsorption cycle, the temperature of the operating tower is maintained low with refrigeration, as with propane, for more effective adsorption and removal of heat that is dissipated as heat of adsorption. At the conclusion of the adsorption cycle, the adsorbed gases are desorbed by introducing a suitable heating medium, such as superheated steam, within a coil located inside of the tower. A temperature of 200 to 350° F., and preferably 300 to 350° F., is adequate for effectively removing nearly all of the adsorbed hydrocarbons from the solid adsorbent.

Natural gas at a well discharge pressure of say 200 pounds per square inch gauge enters via line 34 and is first treated for removal of water by passage through drier 35 which contains a desiccant such as alumina or bauxite. The water-free gas is then passed through chamber 36 that is provided with a reagent for the effective removal of acidic constituents such as hydrogen sulfide and/or carbon dioxide. The gas may be further treated if desired in unit 37 for the decomposition and removal of organic sulfur compounds. The natural gas then passes through line 38 and thence through valve 39 and line 40 into the bottom of adsorption tower 31. Adsorption towers 31, 32, and 33 are provided with refrigeration coils 41, 42 and 43 and also with steam heating coils 44, 45 and 46. At the start of the adsorption cycle in tower 31, the temperature of the tower is maintained at the lowest possible level. During the cycle, the heat dissipated as heat of adsorption is constantly removed by the refrigeration means shown in order to prevent a temperature rise within the tower.

The gases escaping adsorption during the adsorption cycle are rich in nitrogen and may be discarded through line 47, valve 48 and line 58, or processed further for the complete removal of remaining hydrocarbons by a similar activated adsorption treatment or used as fuel for the operation of especially designed gas engines adapted to operate with a nitrogen-rich hydrocarbon gas mixture. Such engines may drive the gas and refrigerant compressors associated with the plant. The off-gas leaving via line 58 may also be burned to supply the heat required for desorption.

At the conclusion of the adsorption cycle in tower 31, valve 39 is closed and the natural gas in line 38 is made to pass through valve 49 and line 50 into the base of tower 32 and the operation is continued as previously indicated for tower 31. Valve 48 at the top of tower 31 is closed at the conclusion of the adsorption cycle in 31 and superheated steam is introduced into heating coil 44 in order to raise the temperature of the tower and thus bring about desorption of the gases adsorbed on the solid adsorbent. The desorbed gases are allowed to escape through line 51 and valve 52 (which is now open) into line 53, through valve 54 and into storage tank 55. The nitrogen-free natural gas from storage tank 55 can be processed further for the separation of the various constituents of natural gas (such as the condensable components, i. e., the $C_3$ and heavier, where such were not removed before processing), or sent to compression system 56 where it is compressed and made ready for pipeline delivery.

During the desorption cycle, the pressure within the adsorption tower undergoing desorption may be reduced to near atmospheric pressure, if desired, by operating compressor 57.

As will be obvious, when adsorption in tower 32 and desorption in tower 31 are completed, the valves are manipulated in such manner as to put tower 31 on-stream and tower 32 on desorption. The manner of switching the towers will be obvious and this may be accomplished automatically if desired.

Adsorption tower 33 may be provided to act as standby equipment in order to process natural gas in case either adsorption tower 31 or 32 is discontinued from operating for regeneration or reloading of adsorbent, or in order to compensate for inequalities in the length of time required for adsorption and desorption. By "regeneration" I refer to the fact that due to accumulation of heavy material which clogs the pores of the adsorbent and causes a slow dropping off of activity it may be necessary to occasionally regenerate the adsorbent as by direct treatment with high temperature steam.

As is shown, the nitrogen-rich residue gas is withdrawn via line 58 to any suitable use or disposal.

All of the considerations advanced above as being applicable to the embodiment of Fig. 1 apply equally to the embodiment of Fig. 2 and vice versa except where they are obviously inapplicable due to the differences in the two types of processes.

As used herein, the term "natural gas" is used in its ordinary sense to designate petroleum gases produced from gas wells and from crude oil wells. This gas may contain paraffin hydrocarbons, water vapor, nitrogen, carbon dioxide, and hydrogen sulfide with mercaptans. Paraffin hydrocarbons present may be methane, ethane, propane, butanes and heavier paraffins, the low molecular weight hydrocarbons being largely predominant. The proportion of individual paraffins varies widely in different gases. The proportion of methane may range from 40 to 100 per cent. My invention is applicable to natural gas containing a substantial proportion of nitrogen, usually at least 5 per cent and commonly around 15 per cent. By the practice of my invention, the proportion of nitrogen may be substantially reduced. The reduction may vary from a few per cent up to substantially 100 per cent, depending upon the economic considerations involved.

EXAMPLES

Experimental work was carried out to determine the selective adsorptivity of methane and nitrogen from a methane-nitrogen mixture through a bed of activated carbon and a bed of silica gel, separately. A synthetic sample of nitrogen and methane was blended by water displacement to contain fifteen mol per cent nitrogen and eighty-five mol per cent methane. The percentage of nitrogen in the blend was checked by analysis.

A twenty-five millimeter tube was filled to a depth of 180 mm. (20.2 grams) with activated carbon (Pittsburgh Coke and Chemical Co., type B10P, 8 x 20). The surface area as shown by the gas adsorption method was 863 square meters per gram. The carbon was degassed at 325° C. to a pressure of $10^{-5}$.

The synthetic mixture was initially dried and passed through the carbon bed at one atmosphere of pressure at a rate of approximately 25 cc. per minute. The tube containing the activated carbon was immersed in a Dry Ice-pentane bath to maintain a constantly low temperature (about −110° F.). The first 35 cc. of effluent from the carbon was analyzed in the same manner as was the original sample. The next 69 cc. of gas was collected in a bottle and discarded; the following 35 cc. of effluent was analyzed for percentage of nitrogen in the same manner as was the original sample. This procedure was repeated until the composition of the effluent approached that of the original mixture. The results obtained are shown in Table I.

TABLE I

*Methane adsorption on activated carbon from methane-nitrogen mixture*

| Percent CH₄ in Effluent | cc. of Gas in Effluent |
|---|---|
| 0 | 35 |
| 3.0 | 139 |
| 13.5 | 243 |
| 39.0 | 347 |
| 66.3 | 451 |
| 78.4 | 555 |
| 82.9 | 659 |

The same twenty-five millimeter tube was then filled to a depth of 160 mm. (28.7 grams) with silica gel (Davison Chemical Co., refrigeration grade). The surface area as shown by the gas adsorption method was 755 square meters per gram. The silica gel was degassed at 325° C. to a pressure of $10^{-5}$ mm. The procedure followed was the same as that for the carbon. The results obtained are shown in Table II.

TABLE II

*Methane adsorption on silica gel from methane-nitrogen mixture*

| Percent CH₄ in Effluent | cc. of Gas in Effluent |
|---|---|
| 32.4 | 35 |
| 47.4 | 139 |
| 64.1 | 243 |
| 77.4 | 347 |
| 82.5 | 451 |
| 84.3 | 555 |
| 84.7 | 659 |

The percentage (mol per cent) of nitrogen in the effluent and the volume of effluent in cc. per gram of adsorbent may be calculated from the data given in Tables I and II and are as given in Tables III and IV below.

TABLE III

*Activated charcoal*

| Mol Percent of Nitrogen in Effluent | Cumulative cc. of Effluent/g. of Activated Charcoal |
|---|---|
| 100.0 | 1.7 |
| 97.0 | 6.9 |
| 86.5 | 12.0 |
| 61.0 | 17.2 |
| 33.7 | 22.4 |
| 21.6 | 27.5 |
| 17.1 | 32.6 |

TABLE IV

*Silica gel*

| Mol Percent of Nitrogen in Effluent | Cumulative cc. of Effluent/g. of Silica Gel |
|---|---|
| 67.6 | 1.2 |
| 52.6 | 4.8 |
| 35.9 | 8.5 |
| 22.6 | 12.1 |
| 17.5 | 15.7 |
| 15.7 | 19.3 |
| 15.3 | 22.0 |

The values given in Tables III and IV are plotted to give the graphs portrayed in Fig. 3 of the drawings. The superiority of activated charcoal to silica gel is clearly evident from the curves since it gives a higher nitrogen content in the effluent for a longer period of time (greater volume of off-gas) before the curve begins to approach the 15 per cent nitrogen level indicating that no nitrogen is removed. With activated charcoal there is considerable delay before the nitrogen content starts to fall off steeply whereas with silica gel the nitrogen level is far short of 100 per cent even at the start (0 cc. of effluent) and immediately falls off very steeply.

In Fig. 4, the slope of the upper or activated charcoal curve of Fig. 3 is plotted as ordinate against the same units for the abscissa as were used in Fig. 3, namely, the cumulative cc. of effluent gas per gram of adsorbent. The curve of Fig. 4 gives a measure of the rate of change of nitrogen concentration in the effluent gas. Since the curve is based on the cumulative effluent gas it is a rough measure of the rate of change of nitrogen concentration with respect to time.

From Fig. 4 it is evident that the slope of the upper curve of Fig. 3 is nearly zero at the start and that at about 7.5 cc. of cumulative effluent it begins to decrease very rapidly approaching a minimum value at about 18 cc. of cumulative effluent, at which point it begins to increase rapidly until about 27.5 cc. of effluent have been collected. At this point it flattens off rapidly and rapidly approaches zero.

In practicing my invention, I prefer to carry out the adsorption at a point at which the slope of the curve obtained by plotting the per cent of nitrogen in the effluent against the cumulative effluent per unit of activated carbon adsorbent (under identical adsorption conditions except with varying amounts of activated carbon and feed gas relative to one another) has not passed the point at which it reaches a minimum value (in a negative sense). That is, I prefer to operate at a point to the left of the point A corresponding to 18 cumulative cc. of effluent per gram of activated carbon on a curve such as the upper curve in Fig. 3. At this point the slope of the curve reverses, that is, whereas to the left of point A the slope was increasing negatively, to the right of point A the slope decreases negatively, as is borne out by reference to Fig. 4. In other words, point A is the point of maximum negative slope of the curve.

More ideal still is operation at a point at which the slope of the curve obtained by plotting the per cent of nitrogen in the effluent against the cumulative effluent per unit of activated carbon adsorbent has not passed the point at which the slope begins to fall off rapidly. On a curve such as the upper curve in Fig. 3 this point corresponds to about 95 molar per cent of nitrogen and 7.5 cumulative cc. of effluent per gram of adsorbent, and to the left of this point the more ideal operation referred to is obtained in the sense that the residue gas more nearly approaches pure nitrogen, and the separation is much more perfect. However, such more ideal operation may not be practical because of economic considerations since the size of the beds required for fixed bed operation or the rate of activated carbon feed to a continuous adsorption unit may be exorbitant.

It will, of course, be understood that while the experimental data from which the curves of Figs. 3 and 4 were derived were based on a batchwise operation they are equally applicable to the design and operation of a continuous unit such as is portrayed in Fig. 1. In applying the batchwise adsorption data upon which the curves are based to continuous adsorption, the figures for cumulative cc. of effluent per gram of adsorbent correspond to the ratio between the volume of effluent gas and the total weight of adsorbent disposed between the point of feed entry and the top of the moving bed. If nitrogen is adsorbed to any appreciable extent in the adsorbent passing the point of feed entry into the bottom section (so that it must be desorbed, displaced or stripped in the section of the moving bed just below the point of feed entry and so caused to reenter the upper or adsorption section of the column), then the ratio for the continuous adsorption column may need to be correspondingly adjusted to compensate for the resulting decrease in efficiency in separation. Thus if 10 per cent of nitrogen is adsorbed in the adsorbent entering the lower portion of the column, the amount of the adsorbent required for a given separation must be multiplied by 110 per cent. It appears that the smaller molecules (the nitrogen molecules) are adsorbed more easily and therefore first and are then displaced by the larger molecules (of hydrocarbon).

It is also to be understood that whereas the data upon which the curves of Figs. 3 and 4 are based were derived with a given set of experimental conditions of temperature, pressure, flow rate, etc., and with specific adsorbents, and therefore are subject to some variation when other conditions are employed, in general these data typify the separation of nitrogen from methane in accordance with my invention and generalizations therefrom within rather broad limits are permissible.

It was wholly unforeseeable that activated carbon should so greatly surpass silica gel for the separation of nitrogen from methane. It was also unforeseeable that in the case of activated carbon the nitrogen concentration would actually be 100 per cent during the initial portion of the adsorption cycle, that the slope of the curve of nitrogen concentration vs. cumulative effluent would not drop rapidly until so large an amount of effluent had been passed, and that the slope of this curve would not reach its minimum value (in a negative sense) until such a large amount of cumulative effluent had passed. As is shown by inspection of Figs. 3 and 4, with activated carbon as the adsorbent the point at which the slope of the curve reaches its minimum value is often such that the effluent gases contain at least 50 per cent of nitrogen (about 56 per cent in Fig. 3) and the point at which the slope of the curve drops rapidly (i. e., increases rapidly in a negative sense) is often such that the effluent gases contain at least 90 per cent of nitrogen.

In some cases it may be economically desirable to operate between the point at which the slope of the adsorption curve (curve obtained by plotting nitrogen concentration vs. cumulative effluent) reaches its minimum value, i. e., its greatest negative value, and the point at which it flattens off rapidly. This would correspond to operation on the upper curve of Fig. 3 between 18 and about 27.5 cumulative cc. per gram of charcoal. Operation under these conditions leaves a high proportion of hydrocarbon in the off-gas but if a use for such gas is at hand, such operation may be justified.

It is old to use an adsorbent to separate methane from ethane and heavier. A marked advantage of my invention over such a separation is that the ratio of the K for nitrogen to the K for methane is much greater than the ratio of the K for methane to the K for ethane. By K I mean the figure obtained by dividing the mol proportion in the free gas phase by the mol proportion in the gas adsorbed on the adsorbent after equilibrium has been established.

Any suitable solid granular adsorbent may be employed in the practice of my invention. Examples are activated carbon, silica gel, and activated alumina. I highly prefer to employ activated carbon since, as is borne out by the experimental work repoted herein, it has much greater hydrocarbon adsorbing ability and also it is much more selective for the hydrocarbons present in natural gas in preferance to nitrogen. The selection of activated carbon having optimum adsorptive properties for separation between nitrogen and methane is preferred and such selection will be well within the skill of the art. As indicated, I believe that activated charcoal is the most effective form of activated carbon for use in the practice of my invention.

The activated carbon may be produced by any known method which gives a carbon having a high gas adsorbing power. In the case of actiuvated charcoal, it is well known that highest adsorbent power is obtained when the charcoal is produced in active form from cellulosic material such as wood, instead of attempting to activate pre-formed charcoal. Methods of making activated carbon suitable for the practice of the present invention are very well known to the art and need not be detailed here.

I claim:

1. The method of removing nitrogen from natural gas containing at least 5 mol per cent nitrogen which comprises continuously feeding the nitrogen-containing natural gas into a continuously downwardly moving bed of a solid granular adsorbent at an intermediate point therein, continuously maintaining the top of said bed at a temperature of from −10 to −155° F., continuously withdrawing overhead a nitrogen-rich unadsorbed gas fraction substantially free of hydrocarbon, continuously heating the bottom portion of said bed to a temperature of from 200 to 350° F. and thereby driving off the adsorbed components, continuously withdrawing the resulting gaseous fraction comprising natural gas which is substantially free of nitrogen, cooling to a temperature in the range of −10 to −155° F. a portion of said overhead fraction by indirect heat exchange with a vaporizing, normally gaseous hydrocarbon in a first heat exchange zone; utilizing the thus cooled portion of the overhead fraction to lift the adsorbent from the bottom of said bed to the top thereof; and cooling the natural gas feed in a second heat exchange zone prior to its introduction to said bed by indirect heat exchange with the partially expanded hydrocarbon from said first heat exchange zone.

2. A process for removing nitrogen from natural gas containing at least 5 mol per cent nitrogen, which comprises gravitating a stream of activated charcoal through a separation zone containing, in descending order, an adsorption section and a desorption section; feeding a cooled stream of natural gas into said separation zone intermediate said adsorption and desorption sections; passing said gas upwardly in said column so as to preferentially adsorb hydrocarbon constituents of same on said charcoal, leaving an unadsorbed stream of gas comprising principally nitrogen; heating said charcoal in said desorption zone so as to desorb hydrocarbon constituents therefrom; withdrawing a stream of desorbed hydrocarbon from said desorption zone as the hydrocarbon product of the process; withdrawing an overhead stream of unadsorbed nitrogen; passing a portion of the nitrogen stream thus withdrawn in indirect heat exchange with an expanding stream of liquid, normally gaseous hydrocarbon so as to cool said nitrogen stream to a temperature below −30° F.; passing the charcoal from the bottom of said separation zone to the top thereof in suspension in the cooled nitrogen stream thereby cooling said charcoal; passing said stream of normally gaseous hydrocarbon from heat exchange with said nitrogen stream in indirect heat exchange with said stream of natural gas and further expanding same so as to cool said natural gas; and regulating the cooling of said nitrogen stream and of said natural gas stream so as to maintain a temperature in said adsorption zone in the range of −30° to −50° F.

GEORGE THODOS.

References Cited in the file of this patent

UNITED STATES PATENTS

| Number | Name | Date |
|---|---|---|
| 879,129 | Dewar | Feb. 11, 1908 |
| 1,335,348 | Patrick et al. | Mar. 30, 1920 |
| 1,422,007 | Soddy | July 4, 1922 |
| 1,825,707 | Wagner, Jr. | Oct. 6, 1931 |
| 1,934,075 | Lewis | Nov. 7, 1933 |
| 2,519,342 | Berg | Aug. 22, 1950 |

FOREIGN PATENTS

| Number | Country | Date |
|---|---|---|
| 48,682 | Netherlands | Jan. 15, 1940 |

OTHER REFERENCES

Publication, "Industrial Chemical Calculations," by Hougen and Watson; John Wiley & Sons Inc., 1936, pages 373–383.

"Hypersorption Process For Separation of Light Gases," by Clyde Berg; Transactions of A. I. Ch. E., volume 42, #4, August 25, 1946.